V. R. HEFTLER.

CARBURETER.

APPLICATION FILED APR. 1, 1915.

Reissued Jan. 11, 1916.

14,045.

WITNESSES

R. A. Balderson

G. B. Bleming

INVENTOR

Victor R. Heftler by Dickerson, Byrnes & Bomeler his Attys.

UNITED STATES PATENT OFFICE.

VICTOR R. HEFTLER, OF DETROIT, MICHIGAN, ASSIGNOR TO SOCIETE DU CARBURATEUR ZENITH, OF LYON, FRANCE, A CORPORATION OF FRANCE.

CARBURETER.

14,045. Specification of Reissued Letters Patent. Reissued Jan. 11, 1916.

Original No. 1,096,626, dated May 12, 1914, Serial No. 684,937. Application for reissue filed April 1, 1915. Serial No. 18,603.

*To all whom it may concern:*

Be it known that I, VICTOR R. HEFTLER, a citizen of the Republic of France, residing at Detroit, in the county of Wayne and State of Michigan, have invented a new and useful Improvement in Carbureters, of which the following is a full, clear, and exact description, reference being had to the accompanying drawings, forming part of this specification.

This invention relates to carbureters, and has for its object an improved arrangement of parts whereby the engine which it serves may be most economically run under ordinary and normal conditions, and which is at the same time capable of furnishing a much richer explosive mixture than usual, when, for example, the low temperature of the air makes it difficult and often almost impossible to secure ignition of a mixture that under ordinary circumstances is fired without difficulty.

Figure 1:
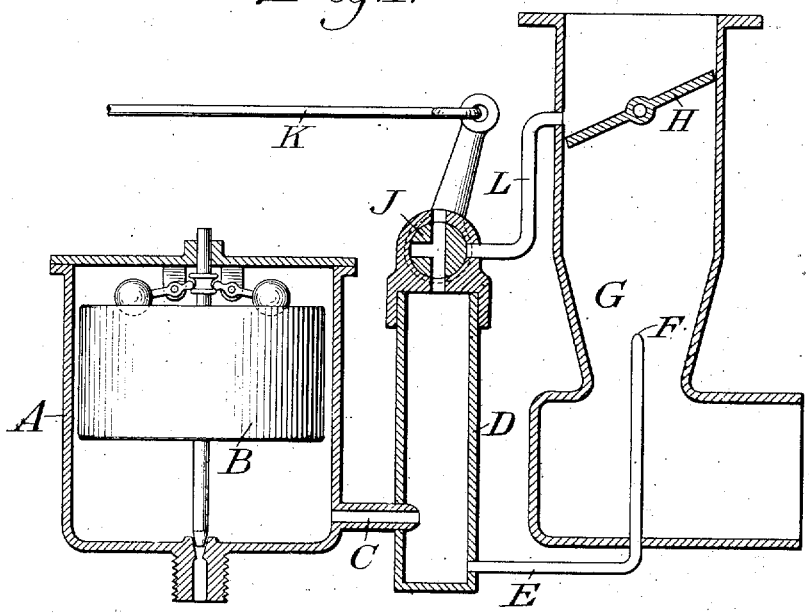
Figure 2:
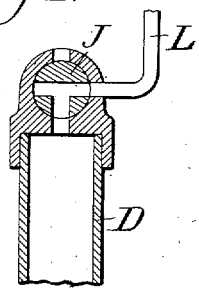
Figure 3:
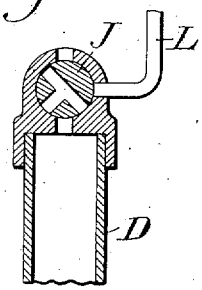

In the drawings: Figure 1 is an elevation, partly in section, of a carbureter of my improved type, showing the controller and regulating valve in its normal open position. Fig. 2 is a fragmentary and largely sectional view showing the valve adjusted so as to connect the supply chamber of the carbureter directly with the intake pipe connecting with the engine cylinder. Fig. 3 is a similar view, with the valve closed, so as to shut off the supply chamber from the outside atmosphere, thereby enabling a richer mixture to be ejected from the spraying jet in the carbureter chamber.

A represents the float chamber of a carbureter, in which is the usual stem-guided float B, and from which a passage C leads to the supply chamber D. A passage E in turn leads from this chamber into the carbureting chamber G, terminating in the spray nozzle F. The throttle member B regulates the quantity of explosive admitted to the engine cylinder.

At the top of the supply chamber is a three-way valve J, which, when in the open position shown in Fig. 1, connects the interior of the chamber directly with the atmosphere, thereby subjecting its interior and its liquid fuel contents, which it has received through the passage C, directly to the influence of atmospheric pressure, thus giving this influence to the regulation of the supply of fuel furnished to the supply chamber and therefrom sucked into the carbureting chamber. When, however, a richer mixture than ordinary is temporarily wanted, as for example when the temperature is so low that an explosive mixture of ordinarily suitable proportions that would at working temperature easily ignite, can with difficulty, if at all, be ignited, a pull upon the controlling link K turns the valve plug J so as to close the top of the supply chamber entirely, thus cutting off the atmospheric pressure regulation of the quantity of fuel delivered into the supply chamber, and drawn thence into the carbureting chamber. A much richer mixture is thus drawn through the spray nozzle by the suction in the exhaust to the engine cylinder, so rich that, in spite of the low temperature of the air its ignition by the usual means is easy, and by turning the valve J farther to the position shown in Fig. 2, the supply chamber may be connected directly with the exhaust portion of the carbureter chamber which leads to the engine cylinder the medium of the pipe L, thus enabling a still stronger suction upon the supply of fuel in the float chamber A.

At low suctions, the level of the fuel in chamber D does not fall sufficiently to uncover the passage E for the passage of air therethrough, and whether the valve J is in the position shown in Fig. 1 or that shown in Fig. 3, does not materially affect the action. When, however, the suction is high enough to uncover the passage E, when the valve J is in the normal position of Fig. 1 and valve J is then turned to the position shown in Fig. 3, the flow of fuel is greater than if valve J were in the position of Fig. 1. The parts are so proportioned as to uncover the passage E at a proper point in the range of suction in the engine when the valve J is in the normal position of Fig. 1. When the valve J is in the position shown in Fig. 2, the action depends largely upon the position of the throttle. If the throttle is fully open, and the suction is sufficiently low to keep the passage E covered, the flow to the nozzle F is not materially affected by the position of the valve J. If, however, the suction is high enough to uncover E, if the valve J were in the normal position of Fig. 1, the action will be substantially the same, with the valve in this position, as if said valve were closed, as the suction will be transmitted to the passage C. If, however, the throttle is closed, fuel will flow through the passage L, when the valve J is in the position of Fig. 2.

It should be understood that this invention is easily applicable to other carbureters than the specific form here chosen for illustration, the changes necessary being of negligible degree.

What I claim is:

1. In a carbureter, the combination of a float chamber, a supply chamber connected therewith, a carbureting chamber connected with said supply chamber, a pipe leading from said supply chamber to a point in said carbureting chamber near the throttle, and a valve whereby the same may be closed and whereby the connection between said supply chamber and the outside air may be regulated; substantially as described.

2. The combination of a float chamber, a supply chamber, and a carbureting chamber connected in the order named, a pipe leading from the top of the supply chamber to a point above the throttle in the carbureting chamber, and a valve whereby the same may be regulated, and by whose further movement the interior of the supply chamber may be exposed to atmospheric pressure.

3. In a carbureter, a constant level feed chamber, a well having an air inlet in its upper portion, a fuel supply channel extending from the constant level chamber into the well, a feed tube leading from the lower portion of the well into the carbureting passage and a hand controlled valve device arranged to control the admission of air to the upper portion of the well; substantially as described.

In testimony whereof, I have hereunto set my hand this 31st day of March 1915.

VICTOR R. HEFTLER.

Witnesses:
H. M. Corwin,
A. F. Tibbetts.